July 28, 1942.    N. T. QUINNEY    2,291,090
REFRIGERATOR
Filed March 4, 1942    5 Sheets-Sheet 1

Inventor
Norman T. Quinney,
By McMorrow & Berman
Attorneys

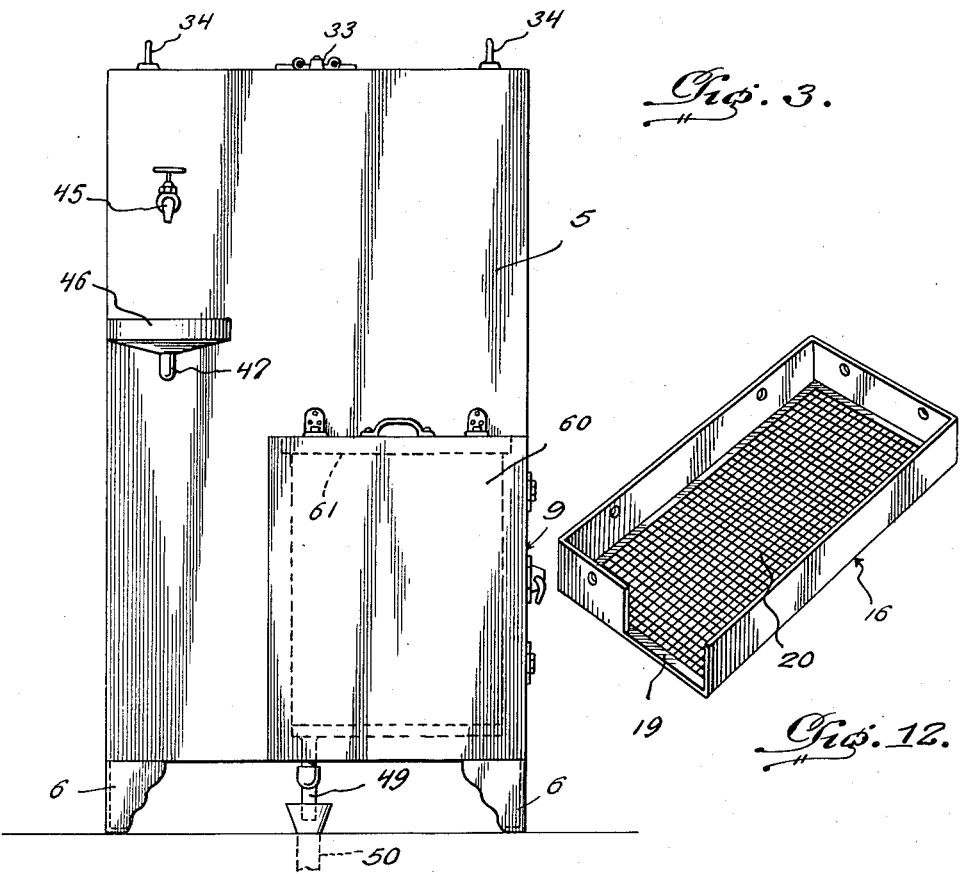
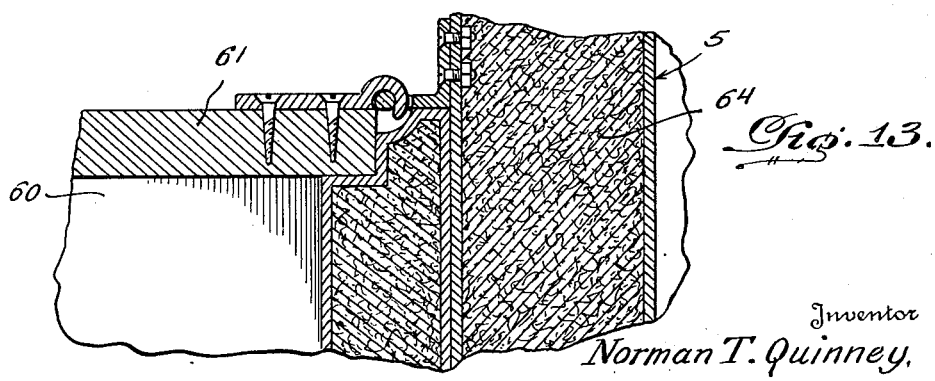

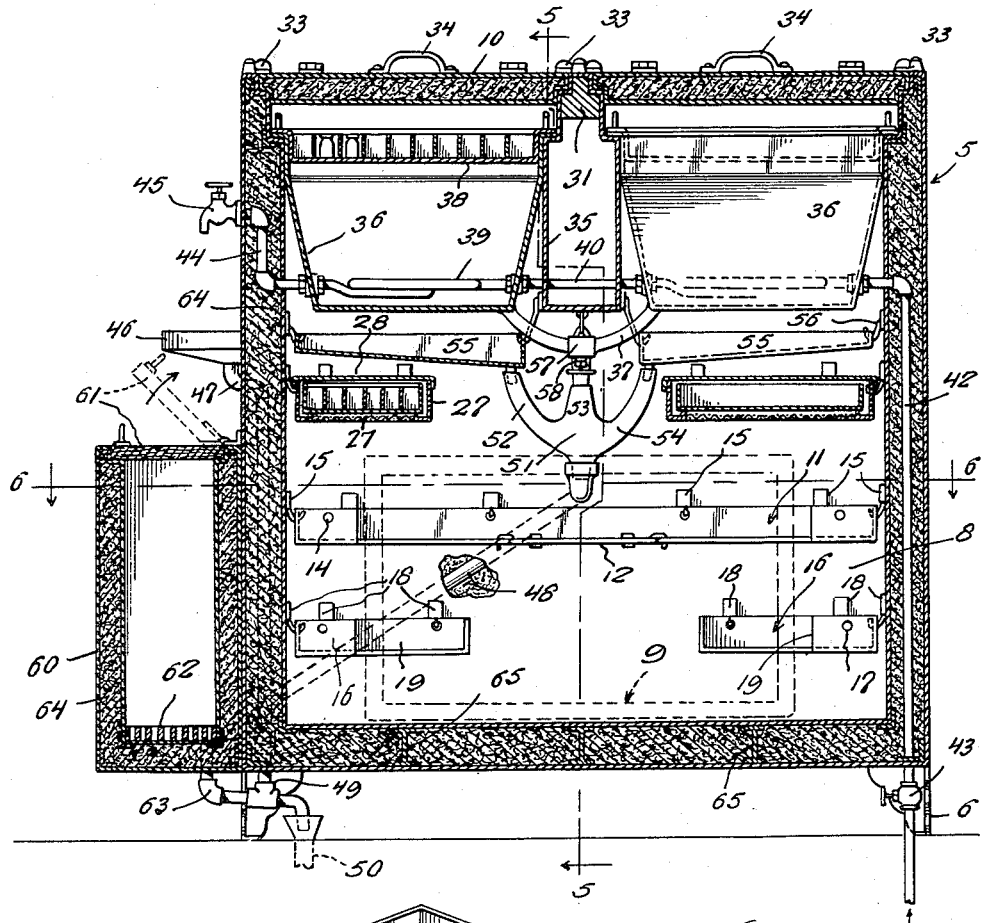
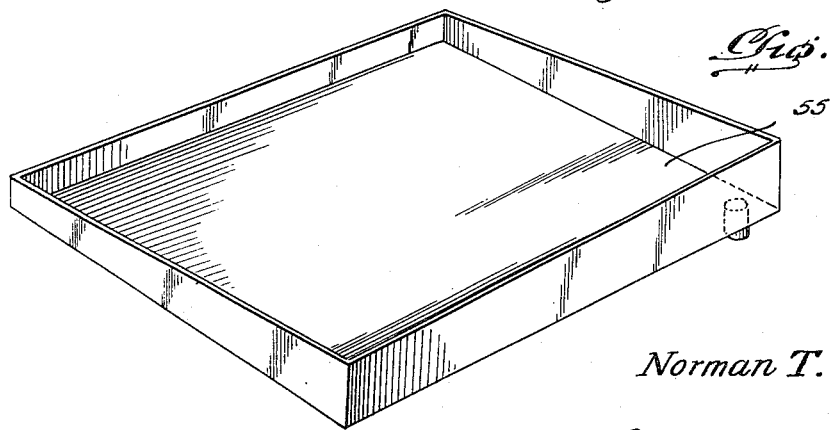

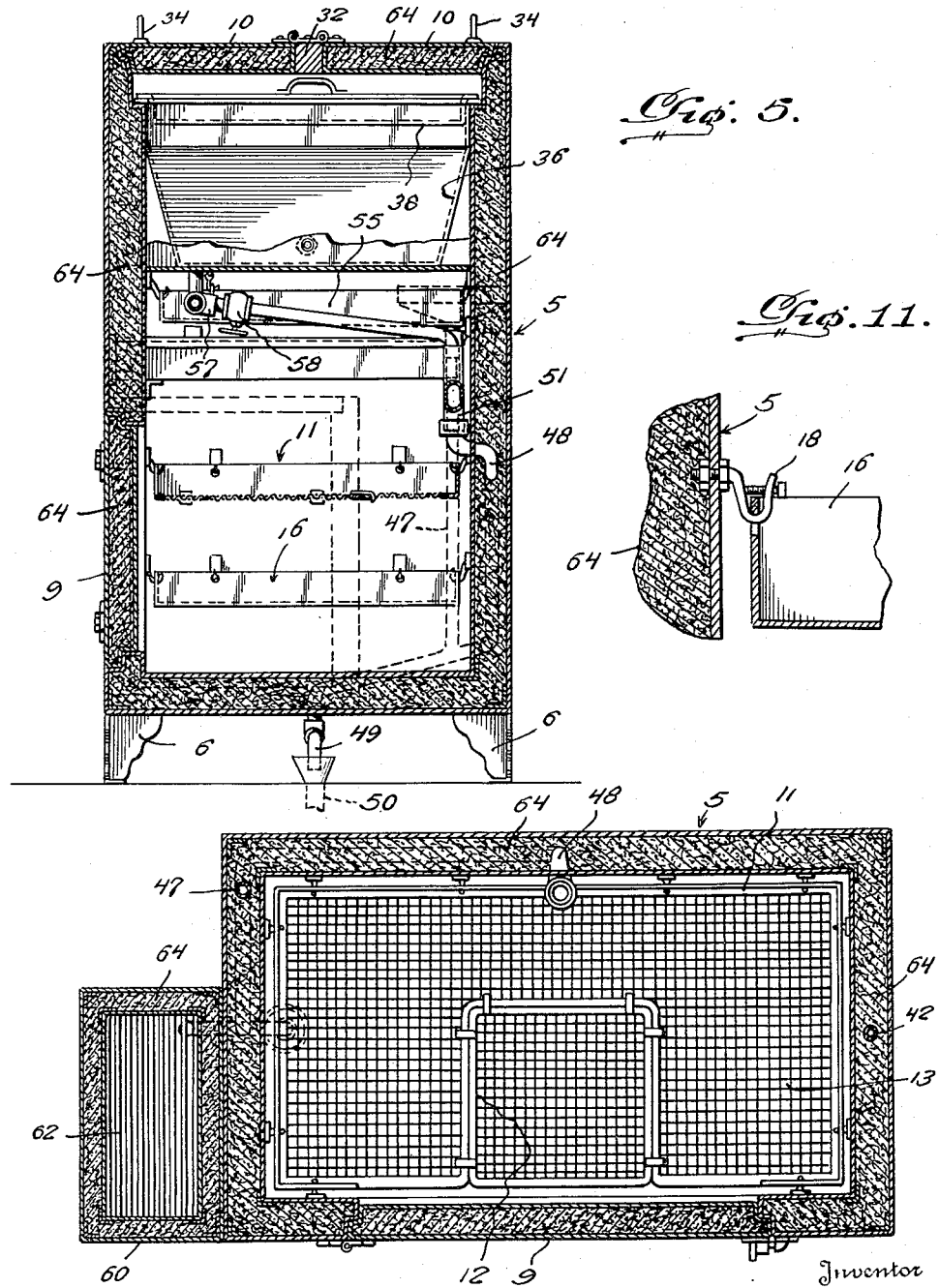

July 28, 1942.  N. T. QUINNEY  2,291,090
REFRIGERATOR
Filed March 4, 1942  5 Sheets-Sheet 5

Inventor
Norman T. Quinney,

By McMorrow & Berman
Attorneys

Patented July 28, 1942

2,291,090

UNITED STATES PATENT OFFICE 2,291,090

REFRIGERATOR

Norman T. Quinney, Miami, Fla.

Application March 4, 1942, Serial No. 433,379

12 Claims. (Cl. 62—142)

This invention relates to refrigerators especially adapted for restaurants, hotels and other eating establishments, and has for the primary object the provision of an efficiently insulated and economically constructed device of this character which will provide accommodations for a large supply of individual servings of cream and butter, maintaining said foods in proper condition for serving over a maximum length of time and in such a manner that the servings may be easily and quickly obtained when needed.

Another object of this invention is the provision of chilling means for the servings which also acts to chill the entire interior of the device and for chilling a drinking water supply.

A further object of this invention is the provision of accommodations for other food products than that above specified and an additional supply of individual servings of cream and butter within the device and cooled by the chilling means.

A still further object of this invention is the provision of means for collecting condensation and drainings from the chilling means and waste water from the drinking water supply and directing thereof to a common drain or sewer connection, said first means being easily accessible for cleaning when necessary.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a front elevation illustrating a refrigerator constructed in accordance with my invention.

Figure 3 is an end elevation illustrating the device.

Figure 4 is a vertical sectional view illustrating the interior construction of the device.

Figure 5 is a sectional view taken on the line 5—5 of Figure 4.

Figure 6 is a sectional view taken on the line 6—6 of Figure 4.

Figure 10 is a perspective view illustrating one of the condensation collecting pans.

Figure 11 is a fragmentary sectional view illustrating one of the means of removably mounting either the trays or racks within the cabinet of the device.

Figure 12 is a perspective view illustrating one of the trays.

Figure 13 is a fragmentary sectional view illustrating a hinge mounting for the cover of an ice chest of the device.

Figures 1, 2:
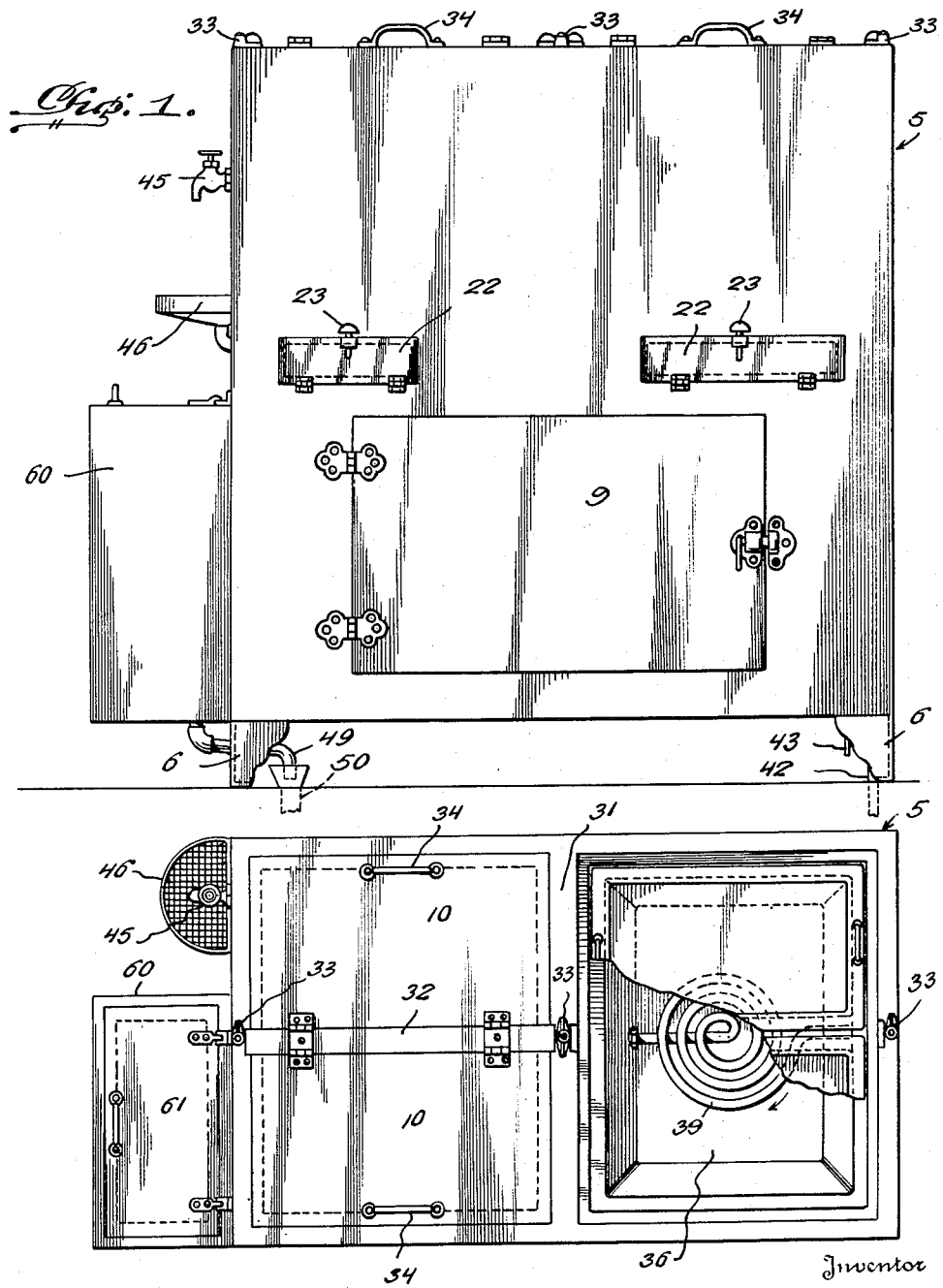
Figure 2 is a top plan view partly broken away illustrating the device.
Figure 7:
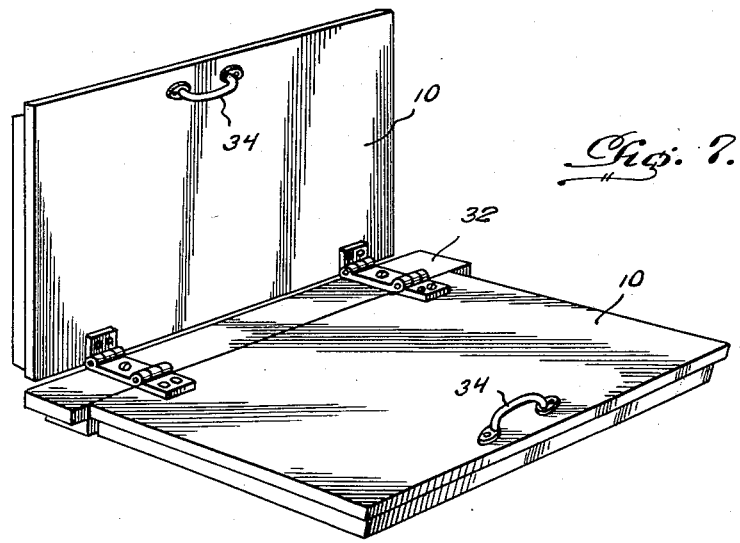
Figure 7 is a perspective view illustrating one of the pairs of doors for closing the upper end of the cabinet of the device.
Figure 8:
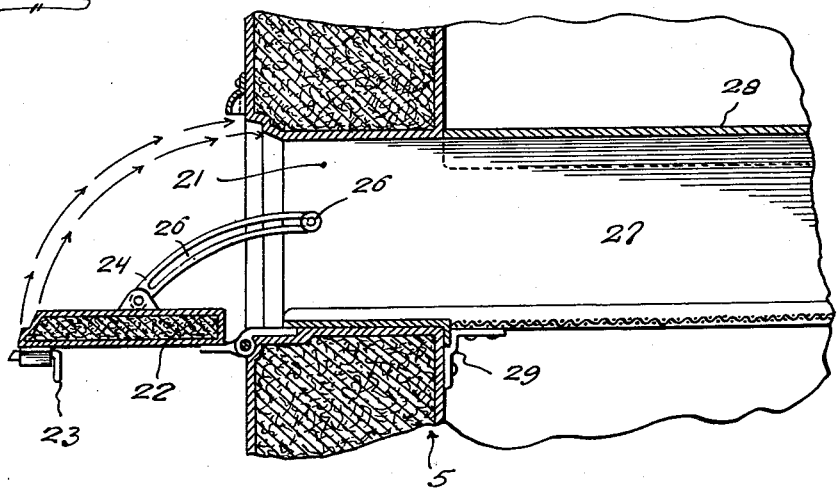
Figure 8 is a fragmentary vertical sectional view showing one of the entrances and closure door of the cabinet for providing access to a rack for the support of an additional supply of either individual cream or butter servings.
Figure 9:
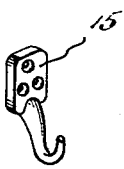
Figure 9 is a perspective view illustrating one of the supporting hooks employed in the device.

Referring in detail to the drawings, the numeral 5 indicates a cabinet of the device equipped with supporting legs 6 to elevate the cabinet a desired distance from the floor. The cabinet has a main cooling chamber 8 and access thereto may be by way of a front door 9 and pairs of top doors or lids 10. The doors are hingedly mounted and provided with suitable fasteners for retaining them in closed position and easily operated by a person when desiring to gain access to the main chamber either from the top of the cabinet or from the front adjacent the bottom.

The front door closes an entrance of considerable size so that large articles, containers and the like may be readily placed into and removed from the cabinet. A main tray 11 is removably mounted in the lower portion of the chamber 8 and includes a removable bottom section 12 so that said section can be removed whenever it is desired to stand a tall container or the like within the lower portion of the chamber 8. The main tray 11 has a foraminous bottom wall 13 and solid upstanding walls provided with openings 14 to receive hooks 15 mounted on walls of the cabinet for removably mounting the tray within the main chamber 8.

Auxiliary trays 16 are mounted in the chamber 8 below the main tray 11 at opposite sides of the cabinet by having the solid walls 17 thereof apertured to receive hooks 18 mounted on the cabinet. One of the end walls of each of the auxiliary trays 16 is cut away, as shown at 19, to permit placing in and removing therefrom articles by way of the entrance closed by the large front door 9. The trays 16 are provided with foraminous bottom walls 20. The auxiliary trays being spaced underneath the main tray 11 will permit the large containers and like devices to be arranged between said auxiliary trays and the bottom of the cabinet within the lower portion of the chamber 8.

The cabinet in the front wall thereof above the door 9 is provided with entrances 21 closed by hinged doors 22 that open downwardly when released by their latches 23. To limit the downward movement of the doors 22, braces 24 are pivoted thereto and have slots 25 slidably receiving pins 26 mounted in the entrances 24.

Mounted within the chamber 8 of the cabinet above the main tray 11 are racks 27 communicating with the entrances 21 and provided with removable covers 28. The purpose of the racks 27 which have foraminous bottom walls is to support a reserve supply of individual servings of cream and butter, it being understood that the servings of cream are arranged within one of the racks while the servings of butter are arranged within the other rack.

The racks 27 are removably mounted on the walls of the cabinet in a like manner to the mounting of the trays 11 and 16. Also said racks are further secured to the walls of the cabinet by brackets 29. The walls of the entrances of the cabinet and the doors are rabbeted to provide effective seals against the entrance of atmospheric aid to the chamber 8 when the doors are in closed position.

The upper entrances to the cabinet are partly formed by a dividing strip 31 fixed to the walls of the cabinet and detachably secured thereto are hinge strips 32 on which the top doors or lids 10 are hinged. To releasably secure the hinge strips 32 in position on the cabinet and the strip 31 turn buttons of the pivoted type are employed and shown at 33. All of the doors are equipped with handles 34 to facilitate the opening and closing thereof.

Carried by the strip 31 within the chamber 8 is a partition 35 and the latter as well as certain walls of the cabinet are shouldered to form rests for ice bins 36 equipped with drain pipes 37. The racks for the support of individual servings of cream and butter are shown at 38 and rest upon the shoulders and may be easily lifted from the cabinet by any one of the upper entrances controlled by the doors 10. Each individual serving of cream or butter may be obtained from the racks 38 when desired. The bins are filled with ice and arranged within said bins are cooling coils 39, connected together, as at 40.

A water supply pipe 41 is connected to one of the coils and extends through one of the walls of the cabinet for connection to a water source or main and is provided with a control valve 43. The other coil 39 has an outlet pipe 44 connected thereto and extending through one of the side walls of the cabinet and is provided with a control faucet 45 arranged above a drip pan 46 mounted on said last referred to end wall of the cabinet and to which a drain pipe 47 is connected. The drain pipe 47 enters the latter-named end wall of the cabinet and connects with a drain pipe 48. The drain pipes 47 and 48 at their point of connection join with a main drain 49 extending through the bottom of the cabinet and is adapted to be arranged over a sewer or drain connection 50.

The drain pipe 48 extends upwardly in a diagonal direction within the chamber 8 and is connected with a fitting 51 provided with branches 52, 53 and 54. The branches 54 and 52 are connected to drain nipples of condensation collecting pans 55 arranged under the ice bins 36 and removably supported on the partition 35 and walls of the cabinet by hooks 56. The branch 53 of the fitting 51 connects with a fitting 57 having a control valve 58 and branches 59 to which the bin drain pipes 37 are connected.

Mounted on an end wall of the cabinet below the drip pan 46 and faucet 45 is an ice chest 60 in which crushed or finely broken ice may be kept for filling drinking glasses adapted to be filled with drinking water from the faucet. The chest 60 is provided with a hinged lid 61 for controlling the entrance thereto. Also the chest is provided with a grating 62 arranged over a drain 63 and the latter connects with the main drain pipe 49.

The cabinet, chest and doors are of double wall construction providing therein dead air spaces filled with insulation 64. Suitable reinforcing elements 65 are arranged between the inner and outer bottom walls of the cabinet for reinforcing the inner wall so that it will be capable of withstanding heavy loads.

The connections between the fittings 51, 57 and drain pipes are such that they may be readily separated to allow them to be easily cleaned when necessary.

From the foregoing description taken in connection with the accompanying drawings it will be seen that a very efficient refrigerator has been provided cooled by ice which will be kept for a maximum length of time due to the insulated construction of the cabinet and its doors. The ice is arranged in bins and the latter so arranged within the cabinet that air circulation can be freely had about the bins to permit cooling of the interior of the cabinet throughout, so that all trays and their contents as well as the racks and containers arranged within the cabinet will be kept at a temperature that will assure against spoiling of any of the food products arranged within the device.

Also, it will be seen that the construction of this device will permit individual servings of cream, butter or like foods to be easily obtained therefrom and replenished by a supply kept at a proper temperature within the device when need occurs. Further it will be seen that the ice used for chilling the interior of the cabinet is also employed for chilling or cooling drinking water easily obtained through a spigot arranged on the exterior of the cabinet and having accessible thereto an ice chest containing crushed ice for filling the drinking glasses, with a drip pan to catch any overflow or drippings either from the drinking glasses or the spigot and directing the same into a sewer or the like.

Further, it will be seen that all condensation and drainage from the ice bins will be taken care of and directed into the main sewer.

A refrigerator of the kind described, will fulfill a well known need for hotels, restaurants and other eating establishments.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a refrigerator, a cabinet open at its upper end, a series of doors for opening and closing said upper end of the cabinet, ice chilling bins removably mounted in the cabinet adjacent the upper end thereof and accessible when said doors are in open position, means for supporting individual servings of foods in said bins and removable therefrom and each serving being accessible when the doors are opened, water chilling coils arranged in said bins and connected to each other, means for connecting one of said coils to a water supply, and a water dispensing means connected to the other coil and extending through the cabinet to be operable from the exterior thereof.

2. In a refrigerator, a cabinet open at its upper end, a series of doors for opening and closing said upper end of the cabinet, ice chilling bins removably mounted in the cabinet adjacent the upper end thereof and accessible when said doors are in open position, means for supporting individual servings of foods in said bins and removable therefrom and each serving being accessible when the doors are opened, water chilling coils arranged in said bins and connected to each other, means for connecting one of said coils to a water supply, a water dispensing means connected to the other coil and extending through the cabinet to be operable from the exterior thereof, and a drain means carried by said cabinet for said first means and said bins.

3. In a refrigerator, a cabinet open at its upper end, a series of doors for opening and closing said upper end of the cabinet, ice chilling bins removably mounted in the cabinet adjacent the upper end thereof and accessible when said doors are in open position, means for supporting individual servings of foods in said bins and removable therefrom and each serving being accessible when the doors are opened, water chilling coils arranged in said bins and connected to each other, means for connecting one of said coils to a water supply, a water dispensing means connected to the other coil and extending through the cabinet to be operable from the exterior thereof, a drain means carried by said cabinet for said first means and said bins, drip pans removably mounted in said cabinet under the bins for catching condensation therefrom, and drain means detachably connected to the first named drain means and to said drip pans.

4. In a refrigerator, a cabinet open at its upper end and including double wall construction to define a dead air chamber, insulation in said chamber, a series of doors removably mounted on said cabinet for opening and closing the upper end thereof, ice chilling bins arranged in the cabinet under the open end thereof, racks for removably supporting individual servings of food in said bins and accessible on the opening of the doors, drip pans removably mounted in the cabinet under said bins, and a drain means connected to said pans and bins.

5. In a refrigerator, a cabinet open at its upper end and including double wall construction to define a dead air chamber, insulation in said chamber, a series of doors removably mounted on said cabinet for opening and closing the upper end thereof, ice chilling bins arranged in the cabinet under the open end thereof, racks for removably supporting individual servings of food in said bins and accessible on the opening of the doors, drip pans removably mounted in the cabinet under said bins, a fitting connected to the drip pans, a second fitting connected to the first fitting and to the bins and including a control valve, and a drain connected to the first named fitting and extending exteriorly of the cabinet.

6. In a refrigerator, a cabinet open at its upper end and including double wall construction to define a dead air chamber, insulation in said chamber, a series of doors removably mounted on said cabinet for opening and closing the upper end thereof, ice chilling bins arranged in the cabinet under the open end thereof, racks for removably supporting individual servings of food in said bins and accessible on the opening of the doors, drip pans removably mounted in the cabinet under the said bins, a fitting connected to the drip pans, a second fitting connected to the first fitting and to the bins and including a control valve, a drain connected to the first named fitting and extending exteriorly of the cabinet, said cabinet having in a vertical wall thereof a main entrance and secondary entrances, doors for opening and closing said entrances, and racks mounted in said cabinet opposite the secondary entrances.

7. In a refrigerator, a cabinet open at its upper end and including double wall construction to define a dead air chamber, insulation in said chamber, a series of doors removably mounted on said cabinet for opening and closing the upper end thereof, ice chilling bins arranged in the cabinet under the open end thereof, racks for removably supporting individual servings of food in said bins and accessible on the opening of the doors, drip pans removably mounted in the cabinet under said bins, a fitting connected to the drip pans, a second fitting connected to the first fitting and to the bins and including a control valve, a drain connected to the first named fitting and extending exteriorly of the cabinet, said cabinet having in a vertical wall thereof a main entrance and secondary entrances, doors for opening and closing said entrances, racks mounted in said cabinet opposite the secondary entrances, a plurality of trays arranged in the cabinet and removable therefrom and below said bins and accessible from one of the entrances.

8. In a refrigerator, a cabinet open at its upper end and including double wall construction to define a dead air chamber, insulation in said chamber, a series of doors removably mounted on said cabinet for opening and closing the upper end thereof, ice chilling bins arranged in the cabinet under the open end thereof, racks for removably supporting individual servings of food in said bins and accessible on the opening of the doors, drip pans removably mounted in the cabinet under said bins, a fitting connected to the drip pans, a second fitting connected to the first fitting and to the bins and including a control valve, a drain connected to the first named fitting and extending exteriorly of the cabinet, said cabinet having in a vertical wall thereof a main entrance and secondary entrances, doors for opening and closing said entrances, racks mounted in said cabinet opposite the secondary entrances, a plurality of trays arranged in the cabinet and removable therefrom and below said bins and accessible from one of the entrances, one of said trays including a removable section to permit merchandise arranged in the cabinet upon the bottom thereof to protrude through and above the latter named tray.

9. In a refrigerator, a cabinet having its upper end open, a dividing strip carried by the cabinet within the open end thereof, door supporting strips supported by the dividing strip and the cabinet, doors arranged in pairs and hinged on said door strips for opening and closing the upper end of the cabinet, ice chilling bins removably mounted in the cabinet below the upper end thereof and adjacent thereto, racks removable from said bins for supporting individual servings of food products, and drain means for said bins.

10. In a refrigerator, a cabinet having its upper end open, a dividing strip carried by the cabinet within the open end thereof, door supporting strips supported by the dividing strip and the cabinet, doors arranged in pairs and hinged on said door strips for opening and closing the upper end of the cabinet, ice chilling bins removably mounted in the cabinet below the upper end thereof and adjacent thereto, racks removable from said bins for supporting individual servings of food products, drain means for said bins, said cabinet having primary and secondary entrances in a wall thereof, doors for opening and closing said entrances, racks in said cabinet and accessible from the secondary entrances and including removable covers and foraminous bottoms.

11. In a refrigerator, a cabinet having its upper end open, a dividing strip carried by the cabinet within the open end thereof, door supporting strips supported by the dividing strip and the cabinet, doors arranged in pairs and hinged on said door strips for opening and closing the upper end of the cabinet, ice chilling bins removably mounted in the cabinet below the upper end thereof and adjacent thereto, racks removable from said bins for supporting individual servings of food products, drain means for said bins, said cabinet having primary and secondary entrances in a wall thereof, doors for opening and closing said entrances, racks in said cabinet and accessible from the secondary entrances and including removable covers and foraminous bottoms, main and auxiliary trays removably mounted in said cabinet and accessible from the primary entrance and one of said trays having a removable section in the bottom thereof.

12. In a refrigerator, a cabinet open at its upper end, a dividing strip carried by the cabinet and located within the open end, hinged doors for controlling said upper end of the cabinet, a partition supported by said strip and the cabinet, said partition and walls of the cabinet being stepped to form rests under the doors, ice chilling bins supported by said rests and separated by the partition, food supporting means carried by said bins and removable therefrom, a drain fitting including a control valve connected to said bins, a second drain fitting connected to the first drain fitting and detachable therefrom, a drain connected to the second fitting and detachable therefrom and extending exteriorly of the cabinet, and drain pans removably supported on the cabinet and the partition and detachably connected to the second fitting and arranged to collect condensation from the bins.

NORMAN T. QUINNEY.